Patented Sept. 30, 1952

2,612,500

UNITED STATES PATENT OFFICE 2,612,500

N(P-AMINOPHENYL)HEXAMETHYL-
ENIMINES

Maynard S. Raasch, Wilmington, Del., assignor
to E. I. du Pont de Nemours and Company,
Wilmington, Del., a corporation of Delaware No Drawing. Application March 29, 1950,
Serial No. 152,753

8 Claims. (Cl. 260—239)

This invention relates to a new class of organic amines. More particularly it relates to aromatic amines which contain a hexamethylenimine radical. Still more particularly it relates to N-(p - aminophenyl)hexamethylenimines and to their preparation and to photographic developer compositions containing the same.

Para-phenylenediamine and its N-dialkyl derivatives having an unsubstituted —NH₂ group are well-known commercial developing agents for the formation of silver images and dye images. However, these compounds are often not highly soluble in the developing solutions and also they are irritating to the skin of most persons. Moreover, in the color development process, the p-phenylenediamines sometimes do not produce the desired color in the final image. For these reasons, numerous derivatives of p-phenylenediamine have been proposed in the technical literature, for example, in U. S. Patent 2,304,953 and in German Patent 723,723.

It has now been found that a new class of organic amines, the N-(p-aminophenyl)-hexamethylenimines, possess an unusually high level of activity as color-coupling photographic developing agents, exceeding even p-amino-diethyl-aniline in that respect in some instances. This property of the new compounds was all the more unexpected since very closely related cyclic compounds such as N-(p-aminophenyl)-piperidine and N-(p-aminophenyl)morpholine are very weak photographic developers.

The new organic compounds of this invention are, generically, the hexamethylenimines having a p-aminophenyl group attached to iminonitrogen and their addition salts with acids, especially strong mineral acids, e. g., hydrochloric, sulfuric, phosphoric and sulphamic.

The hexamethylenimine radical may have one or more hydrogen atoms in the 3, 4 and 6 position substituted by various monovalent radicals including alkyl, ether radicals, e. g., alkoxy, aryloxy, cycloalkoxy radicals, and secondary non-aromatic amino groups

where R is hydrocarbon, preferably of 1 to 12 carbon atoms or the R's together form with the nitrogen atom a cyclic radical of 5 to 6 carbon atoms), etc.

An important class of the N-(p-aminophenyl) hexamethylenimines have the general formula:

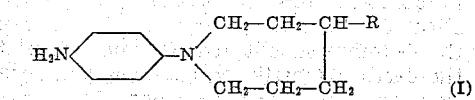

where R is an ether radical, preferably of one to twelve carbon atoms, the oxygen atom of which is attached to the fourth atom of the hexamethylenimine ring. This ether radical may correspond to that of an aliphatic or cycloaliphatic monohydric alcohol or of an aromatically-substituted aliphatic monohydric alcohol or of a mono ether of a glycol including a polyglycol. Thus, R may be alkoxy, alkoxyalkoxy, alkenyloxy, aralkoxy, etc. Suitable specific radicals are methoxy, ethoxy, isobutoxy, tert.-butyloxy, n-octyloxy, dodecyloxy, 2-ethylhexoxy, sec.-butyloxy, ethoxyethoxy, methoxymethoxyethoxy, methoxyethoxy; allyloxy, crotonyloxy, cinnamyloxy; cyclopentyloxy, cyclohexyloxy, 3-methylcyclohexyloxy; geranyloxy; benzyloxy, phenylethoxy, etc. In the preferred compounds of this formula R is an alkoxy radical of 1 to 3 carbon atoms.

The compounds of Formula I can be prepared by reacting the 4-ether substituted hexamethylenimine with a p-nitrohalobenzene and reducing the resulting N-(p-nitrophenyl)hexamethylenimine to convert the nitro group to an amino (—NH₂) group.

Alternatively, the hexamethylenimines may be reacted under heat and pressure with bromobenzene in the presence of copper powder to produce the N-phenylhexamethylenimines, which on nitrosation and reduction yield the N-(p-aminophenyl)hexamethylenimines.

The 4-ether substitutel hexamethylenimines can be advantageously prepared in the same manner as unsubstituted hexamethylenimine by catalytic hydrogenation of the adiponitrile in the vapor phase, as described in U. S. Patent 2,200,282. The ether-substituted adiponitriles can be obtained by addition of the appropriate alcohol or ether alcohol to 1,4-dicyano-2-butene or 1,4-dicyano-1-butene as described in U. S. application Ser. No. 20,830, filed by G. F. Hager on April 13, 1948, now U. S. Patent No. 2,500,942. The reaction can be carried out with a wide range of proportions of reactants but in general it is preferable to use an excess of the alcohol, e. g., 0.1 to 30 moles excess, in order to insure complete reaction of the dicyanobutene. It is preferably carried out by dissolving in the alcohol to be reacted catalytic amounts, e. g., 0.001 to 0.05 mole per mole of dicyanobutene of an alkali metal, e. g., lithium, sodium and potassium, and adding the dicyanobutene to this solution. The reaction is spontaneous and takes place readily at low temperatures, for instance from −10° to +50° C.

Another class of useful N-(p-aminophenyl)-hexamethylenimines are those wherein the substituent radical is a non-aromatic secondary amino radical. A preferred class is:

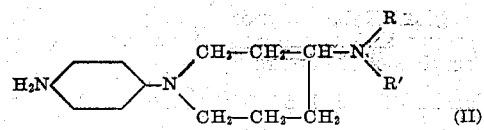

where R and R' are monovalent non-aromatic hydrocarbon radicals, preferably of one to twelve carbon atoms or together form a single bivalent cyclic organic radical of five to six carbon atoms, and are joined to the nitrogen atom through an aliphatic carbon atom. These compounds can be prepared in the same manner as the 4-ether substituted compounds of Formula I by substituting the 4-amino-substituted hexamethylenimine for the 4-ether substituted compound in the reduction procedure described above. In the most preferred compounds of this formula, R and R' are the same and are alkyl groups of 1 to 6 carbon atoms.

Similarly, the 4-amino-substituted hexamethylenimines can be prepared by catalytic hydrogenation of the appropriate beta-aminoadiponitrile after the manner outlined above, and described for hexamethylenimine in U. S. Patent 2,200,282. The beta-aminoadiponitriles can be obtained by adding secondary non-aromatic amines to 1,4-dicyano-2-butene or 1,4-dicyano-1-butene as described in application Ser. No. 28,522. Among the useful beta-aminoadiponitriles which can be so treated are: beta-dimethylaminoadiponitrile, beta-diethylaminoadiponitrile, beta-diallylaminoadiponitrile, beta-di-n-butylaminoadiponitrile, beta-di-n-octylaminoadiponitrile, beta-di-n-dodecylaminoadiponitrile, beta-distearylaminoadiponitrile, beta-dioleylaminoadiponitrile, beta-piperidinoadiponitrile, β-morpholinoadiponitrile, beta-piperazinoadiponitrile, beta-dicyclohexylaminoadiponitrile, beta-thiomorpholinoadiponitrile, beta-pyrrolidinoadiponitrile, beta-hexamethyleniminoadiponitrile, beta-di(beta-methoxyethylamino)adiponitrile, beta-N,N-methylhexamethylenediamino-bis-adiponitrile, and the like. R and R' in Formula II, of course, may correspond to the radicals in the beta-adiponitriles just listed.

Another useful class of compounds are the N-(p-aminophenyl)hexamethylenimines where the carbon atoms in the 3 and 6 positions of the hexamethylenimine ring are substituted by alkyl groups. These compounds have the formula:

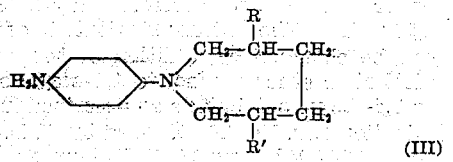

wherein R and R' are preferably low alkyl radicals of one to six carbon atoms, e. g., methyl, ethyl, propyl, n-butyl, n-hexyl and the like. They may be prepared from the corresponding hexamethylenimines, which in turn are made by hydrogenating the alpha-alkacrylonitrile dimers such as methacrylonitrile dimer,

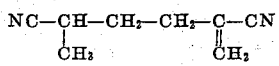

obtained by the process described in U. S. 2,232,785. Moreover, active hydrogen compounds such as alcohols may be added to methacrylonitrile dimer and the product, upon hydrogenation, gives hexamethylenimine having a methyl group on the 3 carbon and an alkoxymethyl group on the 6 carbon.

Hexamethylenimines may also be made by reducing the corresponding caprolactams with lithium aluminum hydride, or in some cases by heating the corresponding hexamethylenediamine hydrochloride.

Photographic developer compositions can be made by admixing the N-(p-aminophenyl)hexamethylenimines and their addition salts with water and an alkali, e. g., sodium carbonate, potassium carbonate, sodium hydroxide, borax, trisodium phosphate, etc.; a water-soluble sulfite, e. g., ammonium, sodium and potassium sulfite; hydroxylamines, amines; a restraining agent, e. g., potassium bromide and other desired developer components. The proportions of the new developing agent and the above-named components may vary over a fairly wide range which can, for instance, be the same as for developer compositions containing N-diethylaminoaniline. In the case of color developer solutions various color formers capable of forming quinoneimine or azomethine dyes can be added to the aqueous solutions.

The invention is illustrated in greater detail but is not intended to be limited by the following examples, in which parts are by weight.

*Example I*

A solution of 60 parts of hexamethylenimine and 47 parts of p-nitrochlorobenzene in 200 parts of n-butyl alcohol was heated at reflux (about 120° C.) for 19 hours. The solvent was removed under reduced pressure and the residue was washed with water, dissolved in 120 parts of concentrated hydrochloric acid and the solution was filtered. The filtrate was diluted with water and made alkaline with sodium hydroxide. The precipitate of crude N-(p-nitrophenyl) hexamethylenimine which formed was filtered off, washed with water and dried. The yield was 60 parts, or 91% of the theoretical. After two recrystallizations from methanol the product melted at 74–76° C.

Analysis:
Calculated for $C_{12}H_{16}O_2N_2$: N, 12.72
Found: N, 12.62, 12.86

A solution of 44 parts of N-(p-nitrophenyl) hexamethylenimine in 140 parts of ethanol was charged with 5 parts of Raney nickel catalyst into a bomb which was heated at 50–60° C. for 1.5 hours under a hydrogen pressure of 1000–2000 lbs./sq. in. to effect quantitative reduction. The resulting reaction mixture was filtered to remove the catalyst and evaporated with excess hydrochloric acid to obtain the dihydrochloride of N-(p-aminophenyl)hexamethylenimine, which was recrystallized from ethanol.

Analysis:
   Calculated for $C_{12}H_{18}N_2 \cdot 2HCl$: Cl, 26.9
                                         Found: Cl, 26.9

*Example II*

A solution of 31 parts of 4-methoxyhexamethylenimine and 24 parts of p-nitrobromobenzene in 80 parts of n-butyl alcohol was heated at reflux for 16 hours. The solvent was removed under reduced pressure and the residue was washed with water and recrystallized from ethanol to give 27 parts (72% yield) of N-(p-nitrophenyl) - 4 - methoxyhexamethylenimine, M. P. 53–55° C. The nitro compound was hydrogenated as in Example I. After recrystallization from alcohol, the dihydrochloride of N-(p-aminophenyl) - 4 - methoxyhexamethylenimine melted at 184–187° C.

Analysis:
   Calculated for $C_{13}H_{20}ON_2 \cdot 2HCl$: Cl, 24.2
                                          Found: Cl, 24.3

The 4-methoxyhexamethylenimine of this example was prepared by hydrogenating beta-methoxyadiponitrile in dioxane solution in the presence of a reduced cobalt catalyst at 120–130° C. and 100–160 atmospheres pressure. It boils at 75–75.6° C. at 15 mm. pressure, $n_D^{25}$ 1.4673, neutralization equivalent 128.3 (calculated: 129.2).

*Example III*

A solution of 19 parts of 4-dimethylaminohexamethylenimine and 30 parts of p-nitrobromobenzene in 80 parts of n-butyl alcohol was heated at reflux for 16 hours. The solvent was removed under reduced pressure, the residue was dissolved in dilute hydrochloric acid and the solution was filtered. Upon adding sodium hydroxide to the filtrate, crude N-(p-nitrophenyl) - 4-dimethylaminohexamethylenimine separated. This was purified by converting it to the sulfate, which after two recrystallizations from methanol was obtained as a light yellow solid melting at 242–244° C.

Analysis:
   Calculated for $(C_{14}H_{21}O_2N_3)_2 \cdot H_2SO_4$: S, 5.13
                                                  Found: S, 5.07

The nitro compound was reduced by heating it with iron powder and water. When reduction was complete, as indicated by the disappearance of the yellow color of the nitro compound, sodium carbonate was added in amount equivalent to the sulfate ion present and the resulting N-(p-aminophenyl) - 4 - dimethylaminohexamethylenimine was extracted from the solids with methanol, then converted to the trihydrochloride, which was recrystallized from methanol. The free base is very soluble in water.

The 4-dimethylaminohexamethylenimine of this example was prepared by hydrogenating beta-dimethylaminoadiponitrile in anhydrous ammonia in the presence of a reduced cobalt catalyst at 125° C. and 2500 lbs./sq. in. pressure. It boils at 75° C. at 8 mm. pressure, $n_D^{25}$ 1.475.

*Example IV*

A solution of 42 parts of 3,6-dimethylhexamethylenimine and 26 parts of p-nitrochlorobenzene in 120 parts of n-butyl alcohol was heated at reflux for 40 hours. The solvent was recovered under reduced pressure and the residue was washed with water. There was obtained 33.5 parts (82% yield) of N-(p-nitrophenyl)-3,6-dimethylhexamethylenimine, M. P. 91–92° C. after recrystallization from methanol.

This compound was hydrogenated according to the procedure described in Example I and the N-(p-aminophenyl)-3,6-dimethylhexamethylenimine was crystallized as the dihydrochloride from ethyl alcohol. When tested in a water-ethyl alcohol solution containing sodium carbonate, N-(p-aminophenyl)-3,6-dimethylhexamethylenimine dihydrochloride showed strong developing action.

The 3,6-dimethylhexamethylenimine of this example was obtained by hydrogenating the dimer of methacrylonitrile in dioxane solution, first with a palladium-on-carbon catalyst at 25–40° C. to reduce the double bond and then with a Raney cobalt catalyst at 125° C. to reduce the nitrile groups. The imine was separated from the reaction mixture by fractional distillation. It boiled at 169–170.5° C.

The N-(p-aminophenyl hexamethylenimines of Examples I, II and III were tested in a developer solution comprising 0.0125 mole of the N-(p-aminophenyl)hexamethylenimine, 25 grams of sodium carbonate, 10 grams of sodium sulfite, 2 grams of potassium bromide and water to make 1000 milliliters (in the case of the compound of Example I, 350 milliliters of alcohol were used as part of the developing composition to effect complete solution). Color film having as the silver halide binder a polyvinyl acetal of a magenta color-forming aldehyde of the type described in U. S. Patent 2,397,864 was exposed, developed in the above solutions and further processed in fixing and bleach baths in the usual manner. Comparative dye densities at 540 millimicrons were as follows:

Product of Example I _____ 2.75
Product of Example II _____ 2.79
Product of Example III _____ 2.48

Under identical conditions, the closely related N-(p-aminophenyl)piperidine gave a dye density of only 0.3, p-aminodiethylaniline gave a dye density of 2.54.

The N - (p - aminophenyl) hexamethylenimines are preferably handled in the form of their addition salts because of their greater solubility and stability. The preferred salts are those formed with organic or inorganic non-oxidizing acids having a dissociation constant above $1 \times 10^{-5}$, e. g., acetic acid, benzoic acid, oxalic acid, chloracetic acid, phosphoric acid, hydrochloric acid, sulfuric acid, etc. The more useful salts are those formed with strong mineral acids.

The N - (p - aminophenyl) hexamethylenimines of this invention are among the strongest known color developers, exceeding in some instances the activity of p-aminodiethylaniline. When a solubilizing group, e. g., dimethylamino, is present they are less apt to cause skin irritation than p-aminodiethylaniline. They may be used in developing compositions containing color formers for color development of exposed silver halide contained either in the conventional gelatin or in a synthetic polymer colloid binding agent, and of film containing immobile color former incorporated in the film, particularly film having as the silver halide binder, polyvinyl acetals of color forming aldehydes, as described in U. S. Patent 2,397,864.

In addition to their use in photographic developing compositions, the N-(p-aminophenyl)-hexamethylenimines of this invention are useful as rubber accelerators, antioxidants for gasoline, stabilizers for halogen-containing plastics, azo and azomethine dye intermediates, etc., and as intermediates for preparing light-sensitive diazo type materials.

As many widely different embodiments of this invention can be made without departing from the spirit and scope thereof, it is to be understood that the invention is not to be limited except as defined by the claims.

What is claimed is:

1. A compound taken from the class consisting of an N-(p-aminophenyl)hexamethylenimine and its acid addition salts.

2. The addition salts of the N-(p-aminophenyl)hexamethylenimines having the general formula:

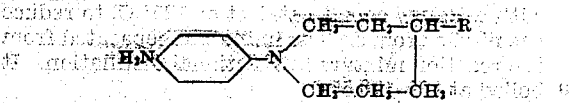

where R is an ether radical, the oxygen atom of which is directly attached to the fourth atom of the hexamethylenimine ring.

3. The addition salts of the N-(p-aminophenyl)hexamethylenimines having the general formula:

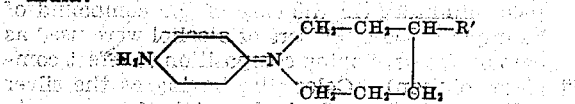

where R' is an alkoxy radical of 1 to 3 carbon atoms.

4. N-(p-aminophenyl)hexamethylenimine.

5. The addition salts of the N-(p-aminophenyl)hexamethylenimines having the general formula:

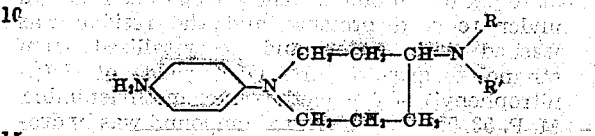

where Q is a non-aromatic secondary amino radical.

6. The addition salts of the N-(p-aminophenyl)hexamethylenimines having the general formula:

where R and R' are alkyl radicals of 1 to 6 carbon atoms.

7. N-(p-aminophenyl)-4-methoxyhexamethylenimine.

8. N-(p-aminophenyl)-4-dimethylaminohexamethylenimine.

MAYNARD S. RAASCH.

REFERENCES CITED

The following references are of record in the file of this patent:

UNITED STATES PATENTS

| Number | Name | Date |
| --- | --- | --- |
| 2,185,480 | Ulrich et al. | Jan. 2, 1940 |
| 2,208,935 | Neal et al. | July 23, 1940 |
| 2,304,925 | Jelley | Dec. 15, 1942 |
| 2,414,491 | Tulagin | Jan. 21, 1947 |

FOREIGN PATENTS

| Number | Country | Date |
| --- | --- | --- |
| 892,034 | France | Mar. 27, 1944 |